Jan. 24, 1956  O. MILLIE ET AL  2,732,515
ILLUMINATION ELECTRIC ARCS

Filed Sept. 19, 1952  5 Sheets-Sheet 1

INVENTOR
Orrin Millie
Joseph Rubay
Jean Paul Latil

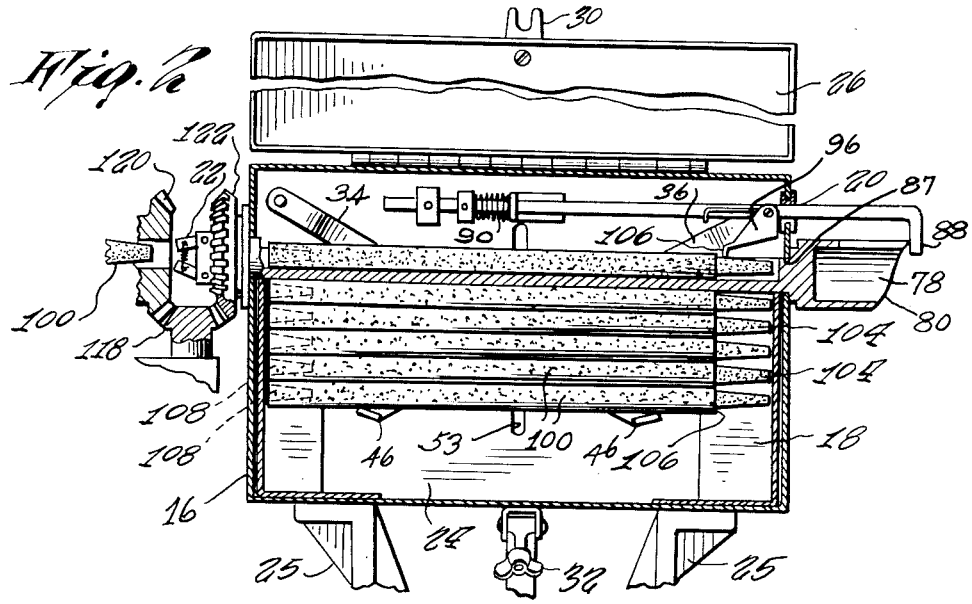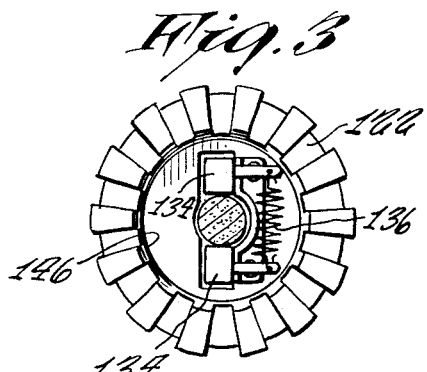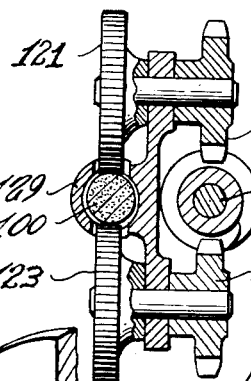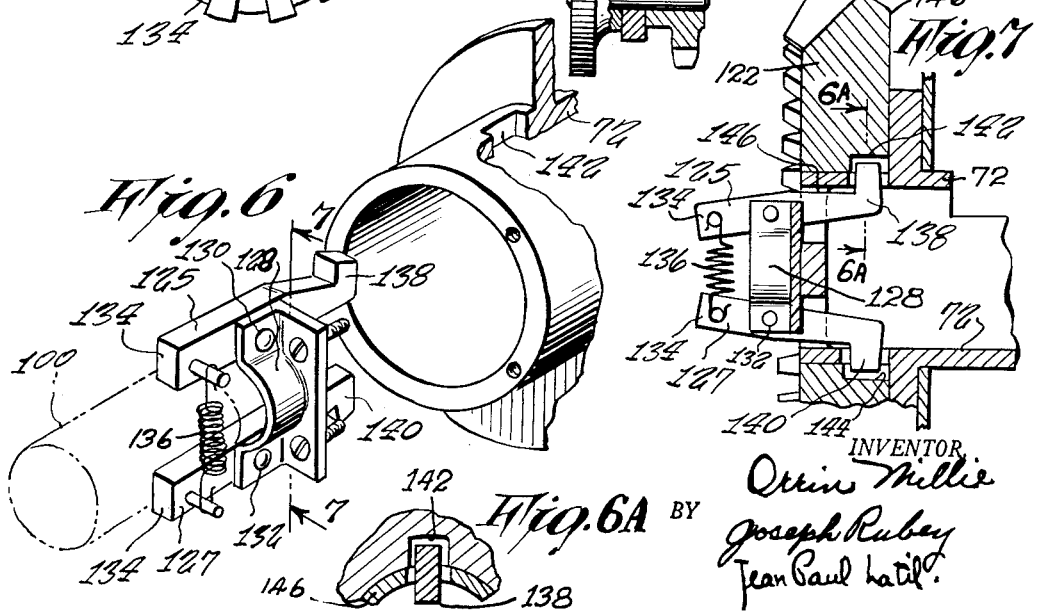

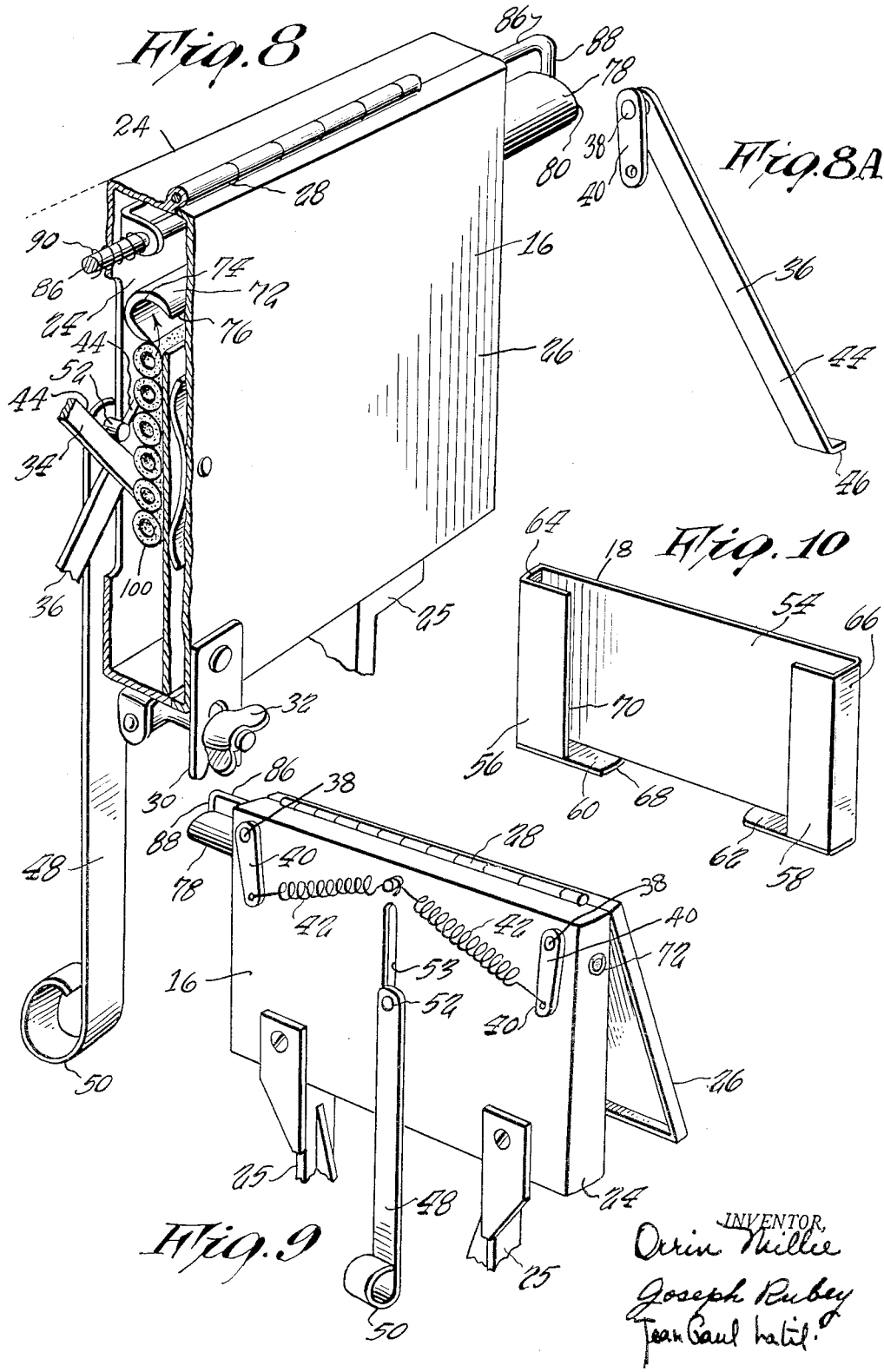

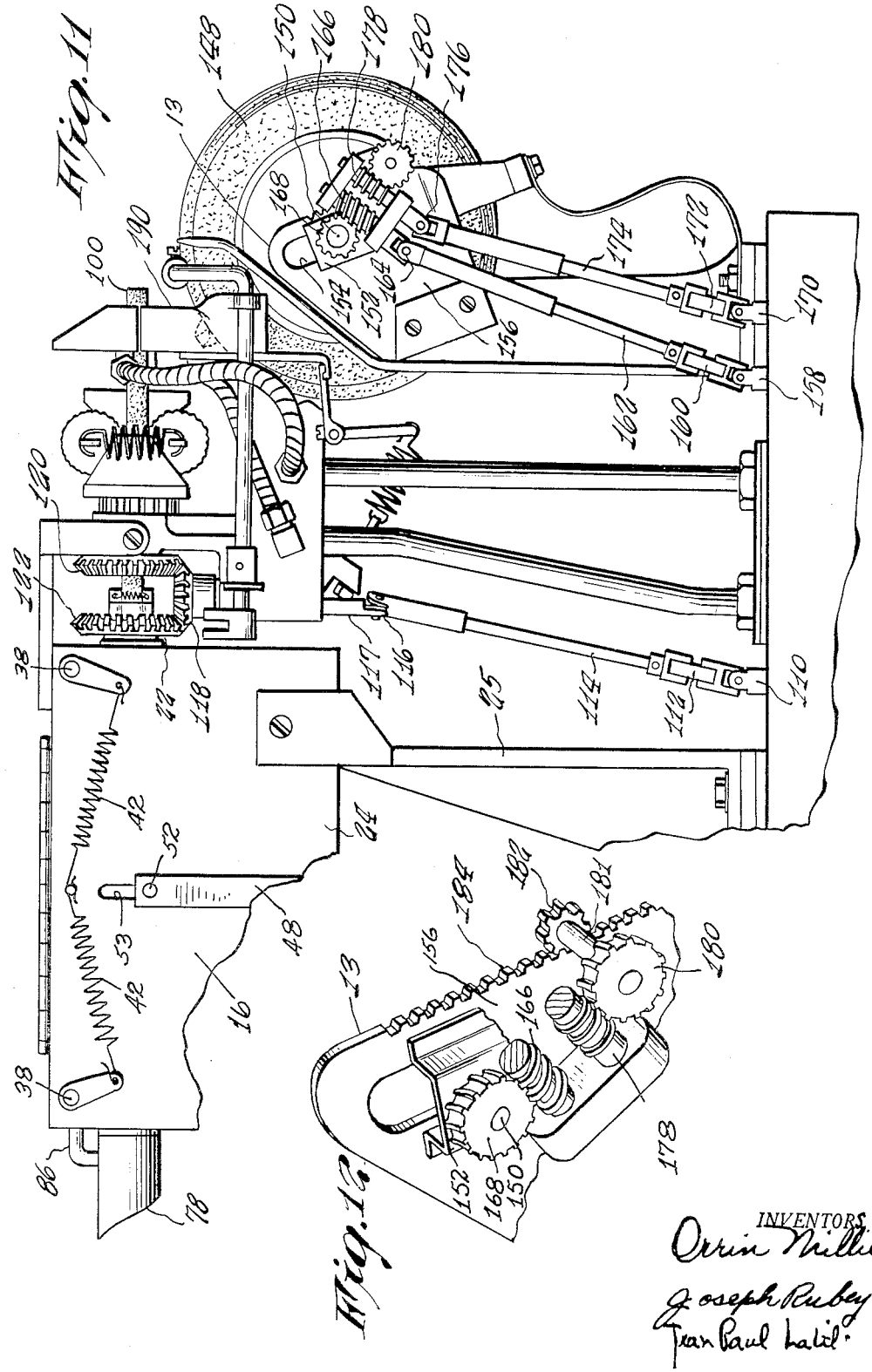

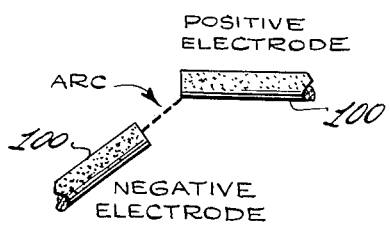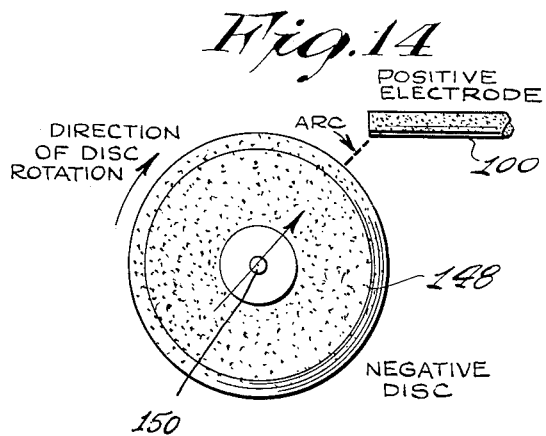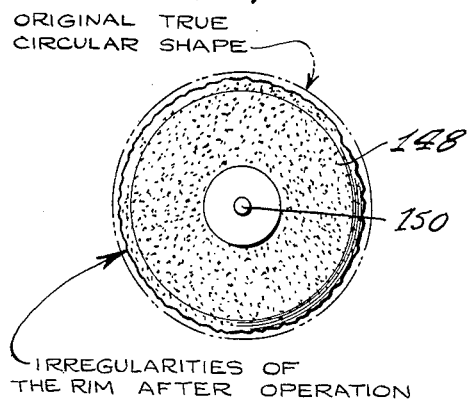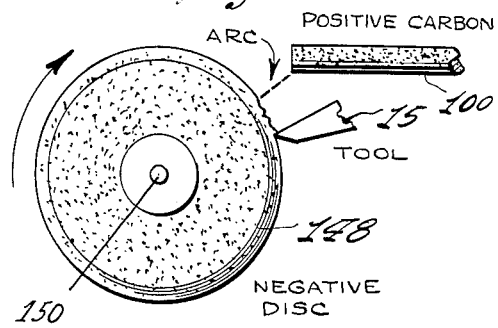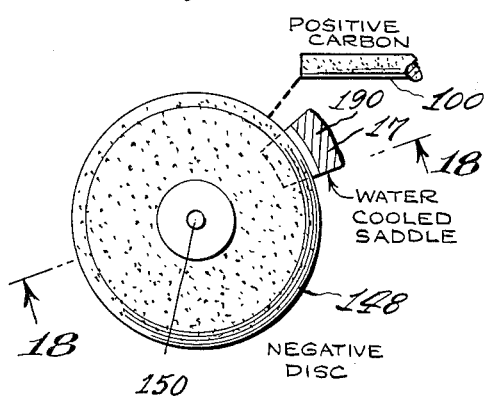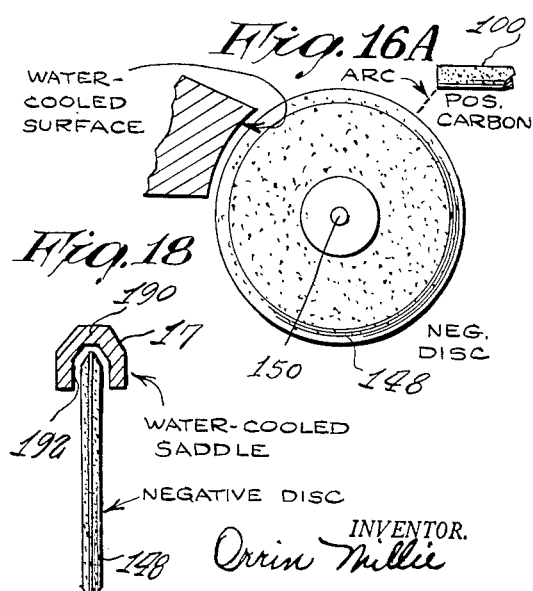

United States Patent Office 2,732,515
Patented Jan. 24, 1956

2,732,515

ILLUMINATION ELECTRIC ARCS

Orrin Millie, Queens, Joseph Rubey, New York, and Jean Paul Latil, Queens, N. Y., assignors to Genarco, Inc., Long Island City, N. Y., a corporation of New York Application September 19, 1952, Serial No. 310,398

13 Claims. (Cl. 314—42)

The subject matter of this patent may be used by or for the Government for governmental purposes without the payment of any royalty.

This invention relates generally to electric arcs and more particularly to those used for the production of substantially continuous illumination.

Among the problems encountered in the maintenance of a uniform arc intensity and pattern, is that with a large consumption of current, the two electrodes become rapidly used up. While it has been known to advance electrode material to the arcing point, where it is desirable to maintain a uniform light source for relatively protracted periods, interruptions in operation occur and it is therefore among the principal objects of the present invention to avoid these interruptions and to provide a substantially continuous source of light.

Another object herein lies in the provision of a substantially continuous electric arc producing device having a generally disk shaped or circular negative electrode with means for rotating same and moving the center of rotation toward the arc point.

Another object herein lies in the provision of structure of the class described having means for maintaining the shape or contour of the disk or circular electrode as it is consumed.

Another object herein lies in the provision of means for feeding a series of positive electrodes in an automatic manner.

Another object of the invention herein lies in the provision of a combination compound carbon electrode feed means and automatic carbon electrode magazine operating in conjunction therewith.

Another object of the invention lies in the provision of substantially completely automatic means for introducing a succession of carbon electrodes to an electrode feed means in such manner that continuity of current supply is constantly maintained and the operation of the arc is without interruption.

A further object of the invention lies in the provision of a novel clip element which is insertable within the carbon rod magazine, to permit a large number of carbon rod electrodes to be inserted simultaneously rather than singly, as has heretofore been the practice.

Still another object of the invention lies in the provision of means for activating the above described magazine, the means being controlled by the passage of carbon rods through the carbon rod feed means.

A still further object of the invention lies in the provision of an improved form of negative carbon electrode and means for advancing the same.

Another object of the invention lies in the provision of an improved means for cooling the negative electrode, thereby preserving the useful life thereof.

A further object of the invention lies in the provision of means for maintaining the operative peripheral surface of the negative electrode in a uniform condition, thereby permitting the maintenance of a uniform gap between the positive and negative electrodes.

A further object of the invention lies in the provision of feed and magazine structure of the class described in which the cost of fabrication may be of a relatively low order, with consequent wide distribution and use.

A feature of the invention lies in the fact that successive carbon rods are joined together automatically as they progress from the magazine to the feed means, so that ordinarily the device requires no manual manipulation over a relatively long period of use.

These objects and features, as well as other incidental ends and advantages, will become more clearly apparent during the course of the following disclosure, and be pointed out in the appended claims.

On the drawings, to which reference will be made in the specification, similar reference characters have been employed to designate corresponding parts throughout the several views.

Figure 2 is a fragmentary sectional view showing the carbon rod magazine which comprises a part of the device.

Figure 3 is an enlarged vertical transverse sectional view as seen from the plane 3—3 on Figure 1.

Figure 4 is an enlarged vertical transverse sectional view as seen from the plane 4—4 on Figure 1.

Figure 5 is an enlarged vertical transverse sectional view as seen from the plane 5—5 on Figure 1.

Figure 6 is an enlarged fragmentary exploded view showing the clutch element which comprises a part of the device.

Figure 6A is a fragmentary sectional view as seen from the plane 6A—6A on Figure 7.

Figure 7 is a fragmentary vertical longitudinal sectional view as seen from the plane 7—7 on Figure 6.

Figure 8 is a fragmentary enlarged view in perspective, partly broken away to show detail of the magazine element.

Figure 8A is an enlarged view in perspective showing one of the tension arms comprising a part of the magazine element.

Figure 9 is a fragmentary view in perspective showing structure of the magazine element not shown on Figure 8.

Figure 10 is a view in perspective showing a clip element which comprises a part of the device.

Figure 11 is a fragmentary view in elevation corresponding to that seen on Figure 1, but showing an opposite side of the device.

Figure 12 is a fragmentary enlarged view in perspective showing a portion of the negative electrode advancement means.

Figure 13 is a schematic view showing the positive and negative electrodes normally employed in conventional electric arc construction.

Figure 14 is a schematic view showing the improved form of negative electrode employed in the present construction, together with arrows indicating the direction of movement thereof when in use.

Figure 15 is a schematic view showing the outer periphery of a negative electrode after substantial use.

Figure 16 is a schematic view showing the means and method by which the negative electrode is trued to its original condition.

Figure 16a is a schematic view showing a means for cooling the negative electrode.

Figure 17 is a schematic view showing the positioning of a water-cooled saddle employed to cool the negative electrode in the present construction.

Figure 18 is a sectional view as seen from the plane 18—18 on Figure 17.

Figure 1:
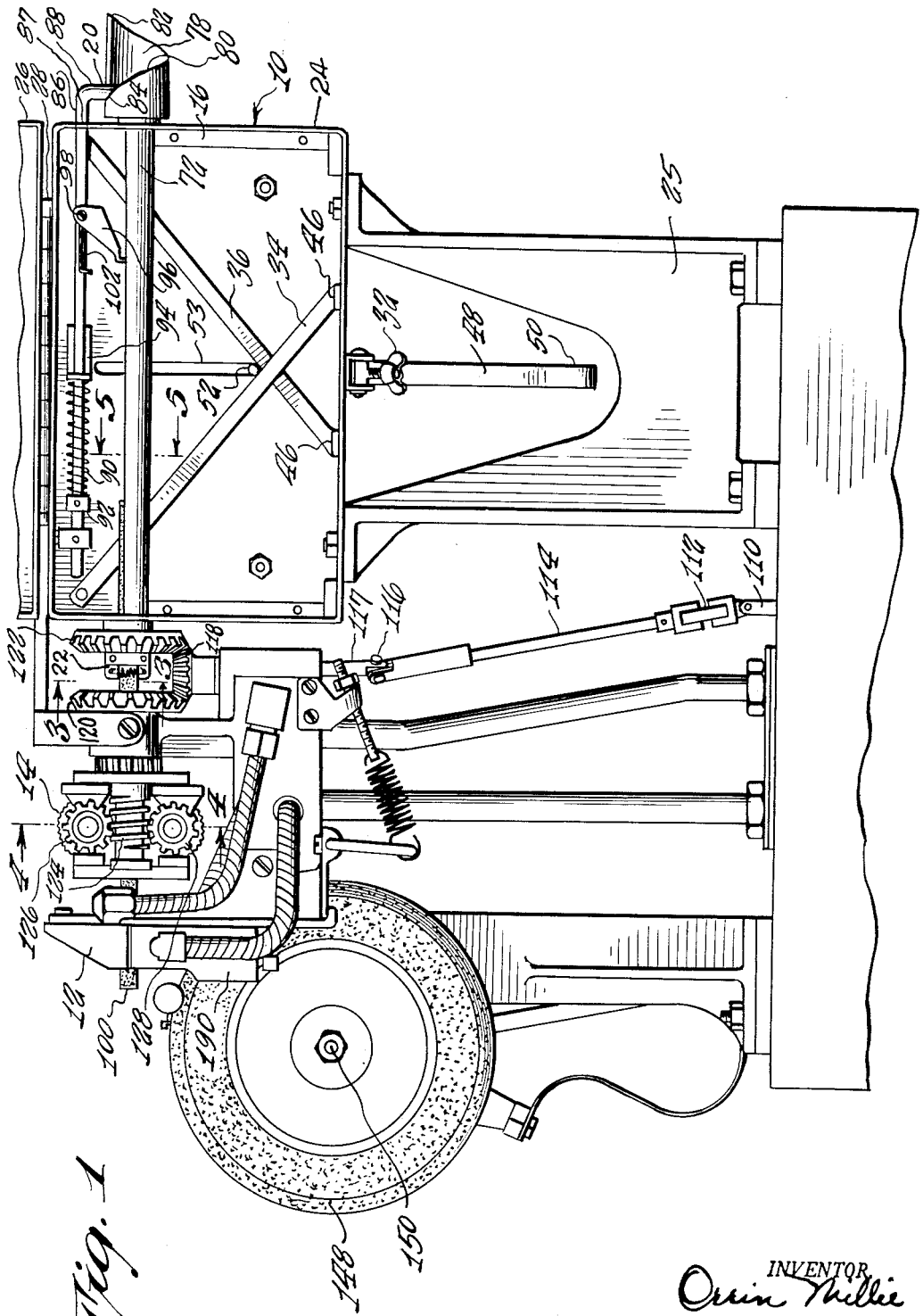
Figure 1 is a fragmentary view in elevation showing an electric arc construction embodying the invention.

In accordance with the invention, the device, generally indicated by reference character 10, forms a part of an arc lamp 12 or similar electric arc construction. The device includes a compound feed means 14, a magazine element 16, a clip element 18, a carbon rod advancement element 20 and a clutch element 22, a negative electrode advancement means 13, a negative electrode trimming means 15, and a negative electrode cooling means 17.

The description of the compound feed means is perhaps best deferred to a point later in the specification, wherein the interrelationship of the same with the other parts of the device will be more clearly apparent.

The magazine element 16 includes a casing 24 mounted upon a suitable bracket 25. Part of the casing 24 is in the form of a cover 26, swingably mounted upon a horizontally disposed hinge 28. The cover is normally maintained in a closed position by the engagement of a clamp 30 with a wing nut 32.

Disposed within the confines of the casing 24 are a pair of follower members 34 and 36, the purpose of which is to urge carbon rods 100 disposed therein in an upwardly direction. The members 34 and 36 are substantially similar, and as may be seen on Figures 9 and 11 each includes a pivotal shaft 38, to which is attached a pivotal arm 40, in turn connected to a tension spring 42. The follower members also include a follower arm at 44, the lower end of which is modified to form a guide portion 46. A loading slide 48 serves to urge the follower members 34 and 36 to their lowermost position (see Figure 1) to permit the insertion of a loaded clip element 18 when it is desired to replenish the supply of carbon rods 100 disposed within the magazine element 16. The loading slide 48 includes a finger engaging portion 50 and a follower arm engaging portion 52 which contacts the upper edges of the follower arms 44, as may be seen on Figure 8. The slide 48 is preferably mounted outside the casing 24, the engaging portion 52 extending through a slot 53, as may be seen on Figure 9.

The clip element 18 provides means for inserting a plurality of carbon rods 100 into the magazine element 16 when the latter has become exhausted. It is preferably formed from a single sheet metal stamping, and as may be seen on Figure 10, the clip element includes an outer wall member 54, a pair of inner wall members 56 and 58, bottom wall members 60 and 62 and side wall members 64 and 66. The wall members 54—66 are arranged to provide a bottom wall opening 68 and an inner wall opening 70, which permit the follower members 34 and 36 to directly contact the lowermost carbon rods 100 without removing the clip element (see Figure 2).

Pivotally mounted within the casing of the magazine element is a feed tube 72, of elongated configuration having an opening at one end thereof and which is indicated by reference character 74. A side opening 76 extends the entire length of the tube 70 and communicates with the end opening 74. As may be best seen on Figures 1 and 2, a portion of the tube 72 projects through the casing 24, thereby providing means for mounting an axial type cam 78. The cam 78 includes a helically shaped cam face 80 having a high point 82 and a low point 84. The slide 86 is mounted for horizontal reciprocation as seen on Figures 1 and 2, the same projecting through an opening 87 in the casing, and having a cam engagement member 88 disposed to ride along the cam face 80. A coil spring 90 is mounted coaxially with the slide 86, one end of which abuts against a coil spring stop 92, and the other of which contacts the slide support 94.

Pivotally suspended upon the slide 86 is a carbon rod advancement claw 96, the same being normally urged to rotate in a counterclockwise direction as seen on Figures 1 and 2 about the axis of the screw 98 by a spring 102.

Referring to Figure 2, it will be observed that the carbon rods 100 are formed to include conical engagement portions 104 forming shoulders 106, at one end thereof, as well as hollow conical recessed portions 108, the configuration of which corresponds to the conical portions 104. The advancement claw 96 is adapted to engage the shoulders 106 of each successive carbon rod as the same is advanced to the feed means 14.

Referring to Figure 1, the feed means 14 is driven by a prime mover (not shown) which transmits power through a shaft 110, universal joint 112, shaft 114, universal joint 116 and shaft 117. A horizontally disposed bevel gear 118 drives a pair of vertically disposed bevel gears 120 and 122 in opposite directions. The left hand gear 120 is mounted upon the worm shaft 124, which drives the gears 126 and 128. As may be seen on Figure 4, the gears 126 and 128 drive the advancement wheels 121 and 123, respectively, the same serving to advance the carbon rod 100 being used as a positive electrode at the time.

The clutch element 22 serves to intermittently interconnect the right hand bevel gear 122 with the carbon rod advancement element 20, at times when a fresh carbon rod 100 is required to continue the uninterrupted operation of the arc. The element 22 preferably includes a pair of pivotal members 125 and 127, the same being mounted upon a bracket 128 which affords rotation about points 130 and 132. Secured to the outer ends 134 of the pivotal members 125 and 127 is a spring 136 which tends to urge the outer ends 134 together. At the opposite ends of the members 125 and 127 are engagement lugs 138 and 140, respectively, the same being adapted to enter recesses 142 and 144 extending inwardly from the inner surface 146 of the gear 122. Since the bracket 128 is mounted upon the tube 72, it is apparent that when the lugs 138 and 140 are engaged within the recesses 142 and 144, the gear 122 is operatively connected to the tube 72. As may be seen on Figure 6, when a carbon rod 100 is disposed between the pivotal members 125 and 127, the members 125 and 127 assume a position wherein the engagement lugs 138 and 140 are clear of the recesses 142 and 144.

Assuming the device to be in the condition shown on Figure 1, wherein the magazine is completely unloaded, a typical sequence of operations is as follows.

The magazine element is loaded by pulling down the finger-engaging portion 50 until the guide portions 46 contact the lower wall of the casing 24, to permit the followers 34 and 36 to become engaged with the lowermost of the carbon rods 100 disposed within the clip. A clip filled with carbon rods is then inserted into the confines of the casing 24, after which the cover 26 is swung downwardly and locked in position by the wing nut 32. As the electric arc operates, the positive carbon rod 100 will be consumed until the end of the same passes through the pivotal portions 125 and 127. When the same clears the outer ends 134, the spring 136 urges the same together, resulting in the engagement lugs 138 and 140 pressing against the inner surface 146 of the gear 122. With continued rotation, the lugs 138 and 140 will enter the recesses 142 and 144, so that subsequent rotation of the shaft 110 will cause the gear 122 to drive the tube 72. As the tube passes through a complete rotation, the cam face 80 draws the slide 86 to its rightwardmost position, as seen on Figure 1, during which time the tube upon passing through a complete revolution exposes the side opening 76 to the uppermost carbon rod 100 then stacked within the clip element 18, which then enters the tube. Subsequent rotation, which occurs as the slide 86 is reaching its rightwardmost position, exposes the side opening 76 in an upwardly direction so that as the cam engagement member 88 is released on passing the high point 82 of the cam, the advancement claw 96 engages the shoulder 106 of the then engaged carbon rod 100 (see Figure 2). The outer surface of the tube 72 at that moment contacts the next succeeding carbon rod 100 and prevents the same from being elevated to discharge position until the succeeding carbon rod 100 then engaged by the tube 72 has passed completely outwardly of the magazine. The return of the slide 86 to its leftwardmost position is very rapid, owing to the location of the high and low points 82 and 84, respectively, of the cam 78. Upon engaging the shoulder 106 of the carbon rod 100, the same is projected through the opening 74 in the tube 72, so that the hollow or socket portion 108 engages the conical portion 104 of the rod 100 then in use as an electrode. The seating is instant and uniform, so that for all practical purposes the rod being used and the rod then joined may be considered integral. Upon the passing of the newly connected rod 100 between the pivotal members 125 and 126, the end portions 134 are again spread apart, causing the lugs 138 and 140 to become disengaged from the recesses 142 and 144, after which the gear 122 continues to idle about the axis of the tube 72, until the next carbon rod 100 is required. Upon the passage of the conically shaped portion 104 past the pivotal members 125 and 127, the cycle is repeated until the lowermost carbon rod 100 in the clip has been engaged within the tube 72. At this point the empty clip element may be removed to be replaced with a fresh one. If desired, a partially emptied clip may also be removed, should reloading be necessary at that point.

The negative electrode 148 is in the form of a circular disk, rather than a conventional elongated type of carbon rod. The carbon advancement means 13 includes a shaft 150 on which the disk 148 is mounted, the shaft 150 in turn being mounted upon a sliding block 152 which reciprocates in a substantially vertical direction within a slot 154 of a support bracket 156, which is relatively fixed with respect thereto. The prime mover (not shown) drives a shaft 158, universal joint 160, telescoping shaft 162 and universal joint 164 to a worm 166. The worm 166 drives a gear 168, which gear is also mounted on shaft 150.

The prime mover also drives a shaft 170 at a much lower rotational speed, which transmits motion through the universal joint 172, the telescoping shaft 174, the universal joint 176, the worm 178, a gear 180, a shaft 181 and a pinion 182 which meshes with a rack 184 on the bracket 156. Thus as the disk 148 is rotated, the same is very slowly elevated as seen on Figure 11 to compensate for the consumption of the disk 148 at the peripheral portions thereof. The shafts 162 and 174 are of a telescopic type to permit positive driving throughout the relative motion of the block 152.

The trimming means 15 and cooling means 17 are shown diagrammatically on Figures 13 to 18, inclusive. Referring to Figure 13, there is shown the conventional negative and positive carbon rod electrode 100 used in conventional electric arc construction. This structure while possessing utility suffers from the fact that it is difficult to maintain proper arc spacing when the arc is operated over any considerable period of time.

On Figure 14 there is shown the structure employed in accordance with the invention, in which there is provided a negative electrode 148 in the form of a carbon disk. As the arc is operated, the disk is rotated in a clockwise direction as seen on Figure 14 to distribute consumption over a relatively wide area and also slowly advanced toward the positive electrode to compensate for the increased clearance caused by the consumption.

On Figure 15 there is shown a view of the disk 148 after considerable use, wherein it will be noted that the outer periphery of the same is of irregular configuration owing to the fact that consumption and erosion have been greater at certain points than at others.

This condition is corrected by the trimming means 15 shown on Figure 16 which is in the form of a tool formed from carbon or high speed steel for example, which is fixed in the path of rotation and serves to cut the irregularities from the surface after the same have occurred. Thus as the disk is rotated in a clockwise direction as shown on Figure 16, a smooth periphery is constantly presented to the arcing point and irregularities formed by consumption are removed immediately afterward as the disk rotates. Since the center of the disk is constantly being advanced toward the positive carbon, the gap over which the arc occurs is maintained substantially constant.

Owing to the intense heat generated by the arc, consumption of the disk 148 is relatively rapid. It has been found that where the heat generated in the disk is dissipated, the useful life of the disk may be greatly increased owing to a reduction in the consumption of the same. The advantages of cooling the disk are numerous. Beside reducing consumption, the cooling allows the disk to keep its initial physical and chemical properties and composition. It also makes possible the removal of the disk more easily for maintenance, service or repair. In addition, it assures better contact between the disk and the structure which supports the disk when it revolves, thereby assuring that no arcing will take place at this point.

The cooling means 17 may take a variety of forms, including the water cooling of structure adjacent the periphery of the disk as it moves past the same. (See Figure 16a.) Heat emanating from the disk is absorbed by the water cooled surface, thus causing the temperature of the disk itself to be lowered. A particularly effective manner of cooling the disk is to pass the same between a water cooled saddle 190 having a slot 192 through which the peripheral part of the disk 148 passes. By the use of this form heat is absorbed from both sides of the disk rather than a single side, thus permitting a far more rapid cooling than would otherwise be the case.

It may thus be seen that we have invented novel and highly useful improvements in electric arc construction, in which there is provided a simple expedient means for feeding successive positive carbon electrodes to a carbon electrode feed means as the same are consumed during the process of operation. The device has relatively few moving parts, and is of such construction that continuous operation for extremely long periods may be made with relatively little supervision. The device is easily reloaded as required, in a matter of a few seconds, it being possible to insert a relatively large number of fresh carbon electrodes simultaneously. Once loaded, the device is substantially completely automatic in operation, being driven by the same prime mover which operates the carbon rod advancement means. The device is readily serviced by the disassembly of relatively few parts, and is of such construction as to require relatively infrequent servicing.

The improvements also include a novel means for feeding the negative carbon electrode which is in the form of a circular disk. Owing to the presence of a trimming means, the advancement means serves to provide a continually smoothed contact surface, well adapted to maintain a uniform gap during extended periods of operation of the arc construction. Means is also provided for the cooling of the negative carbon electrode to assure a relatively long useful life of the same.

We wish it to be understood that we do not consider the invention limited to the exact details of structure shown and set forth in this specification, for obvious modifications will occur to those skilled in the art to which the present invention pertains.

We claim:

1. Electric arc construction comprising: a carbon rod feed means and a carbon rod magazine; said carbon rod magazine having automatic means for singly advancing carbon rods to said feed means; a negative carbon electrode and means for advancing the same to maintain a substantially constant electrode gap; said electrode being in the form of a circular disk; said means including first means for rotating said disk about an axis through the center thereof, at a substantially constant angular velocity, and second means for laterally shifting said axis at a substantially constant linear velocity.

2. Electric arc construction comprising: a carbon rod feed means and a carbon rod magazine; said carbon rod magazine having advancement means for singly advancing carbon rods to said feed means; said advancement means including a clip element positionable within said magazine, said clip element having a supply of carbon rods disposed therein.

3. Electric arc construction comprising: a carbon rod feed means and a carbon rod magazine; said carbon rod magazine having advancement means for singly advancing carbon rods to said feed means; said advancement means including a clip element positionable within said magazine, said clip element having a supply of carbon rods disposed therein; and a resiliently urged cam operated slide successively engageable with said carbon rods to singly urge the same from said magazine.

4. For use in conjunction with electric arc construction, a carbon rod feed magazine and removable clip therefor comprising: a casing; means to maintain said clip within said casing; means to move a group of carbon rods within said clip; a slide engageable with one of said carbon rods of said group; and means for moving said slide to singly eject said carbon rods from said magazine.

5. For use in conjunction with electric arc construction a carbon feed magazine for holding a supply of carbon rods comprising: an outer casing having an opening therein; means for moving said supply of carbons in a first direction toward said opening; second means including a rotatably mounted feed tube having an elongated slot for receiving a single carbon rod, and a slide having means for engaging a carbon rod disposed within said tube for moving said carbon rods singly in a direction at right angles to said first mentioned direction through said opening.

6. For use in conjunction with electric arc construction a carbon feed magazine for holding a supply of carbon rods comprising: an outer casing having an opening therein; means for moving said supply of carbons in a first direction toward said opening; second means including a rotatably mounted feed tube having an elongated slot for receiving a single carbon rod, and a cam operated resiliently urged slide having means for engaging a carbon rod disposed within said tube for moving said carbon rods singly in a direction at right angles to said first mentioned direction through said opening.

7. For use in conjunction with electric arc construction a carbon feed magazine for holding a supply of carbon rods comprising: an outer casing having an opening therein; means for moving said supply of carbon rods in a first direction toward said opening; second means including a rotatably mounted feed tube having an elongated slot for receiving a single carbon rod, a slide having means for engaging a carbon rod disposed in said tube and a cam on the end of said tube for moving said slide in a direction parallel to said tube against the action of a resilient means.

8. For use in conjunction with electric arc construction a combination carbon rod magazine and a carbon rod feed means comprising: an outer casing having an opening therein; means for moving a supply of carbon rods in a first direction toward said opening; second means including a rotatably mounted feed tube having an elongated slot for receiving a single carbon rod, a slide having means for engaging a carbon rod disposed in said tube, a cam on the end of said tube moving said slide in a direction parallel to said tube against the action of a resilient means; means for rotating said tube; said means including a clutch engaged by the movement of a preceding carbon rod through said carbon rod feed means.

9. For use in conjunction with electric arc construction a combination carbon rod magazine and a carbon rod feed means comprising: an outer casing having an opening therein; means for moving a supply of carbon rods in a first direction toward said opening; second means including a rotatably mounted feed tube having an elongated slot for receiving a single carbon rod, a slide having means for engaging a carbon rod disposed in said tube, a cam on the end of said tube moving said slide in a direction parallel to said tube against the action of a resilient means; means for rotating said tube; said means including a clutch engaged by the movement of a preceding carbon rod through said carbon rod feed means, and disengaged by the ejection of succeeding carbon rods from said magazine.

10. Electric arc construction including a negative carbon electrode and means for advancing the same to maintain a substantially constant electrode gap; said electrode being in the form of a circular disk; said means including first means for rotating said disk about an axis through the center thereof at a substantially constant angular velocity, and second means for laterally shifting said axis at a substantially constant linear velocity.

11. Electric arc construction including a negative carbon electrode and means for advancing the same to maintain a substantially constant electrode gap; said electrode being in the form of a circular disk; said means including first means for rotating said disk about an axis through the center thereof and second means for laterally shifting said axis; a tool mounted to contact the outer periphery of said disk and means for imparting relative motion between said tool and the center of said disk.

12. Electric arc construction including a negative carbon electrode and means for advancing the same to maintain a substantially constant electrode gap; said electrode being in the form of a circular disk; said means including first means for rotating said disk about an axis through the center thereof, and second means for laterally shifting said axis; a bracket supporting said first and second means; a cutting tool fixed with respect to said bracket and positioned to engage the peripheral portions of said disk, as the same is rotated.

13. Electric arc construction including a carbon electrode in the form of a disk, and means to cool said disk, said means including a water-cooled, saddle-shaped member having a slot; the peripheral portions of said disk being rotatably positioned within said slot.

References Cited in the file of this patent

UNITED STATES PATENTS

| | | |
|---|---|---|
| 432,284 | Russell | July 15, 1890 |
| 606,108 | Wright | June 21, 1898 |
| 1,275,458 | Meston et al. | Aug. 13, 1918 |
| 1,668,171 | Pratt | May 1, 1928 |
| 2,017,509 | Osborne | Oct. 15, 1935 |
| 2,032,240 | Westhaver | Feb. 25, 1936 |